Figure 1:
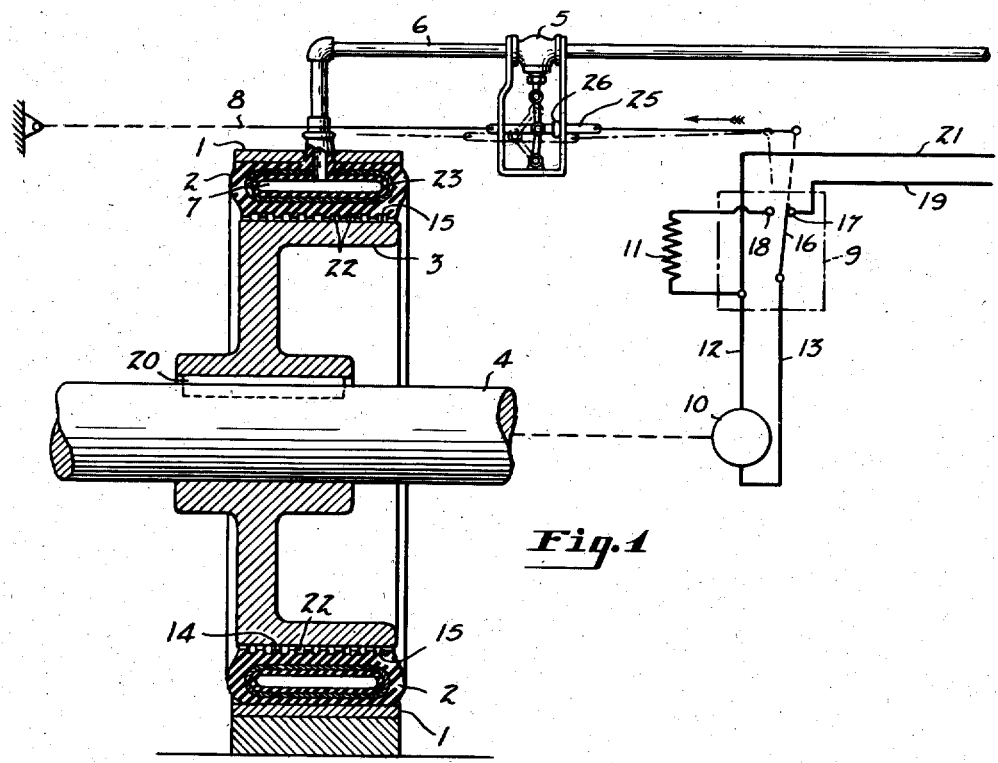

Sept. 30, 1941.    H. T. KRAFT    2,257,610
MOTOR CONTROL AND BRAKE MECHANISM
Filed Feb. 16, 1939

INVENTOR
HERMAN T. KRAFT
BY *Evans & McBoy*
ATTORNEYS

Patented Sept. 30, 1941

2,257,610

UNITED STATES PATENT OFFICE 2,257,610

MOTOR CONTROL AND BRAKE MECHANISM

Herman T. Kraft, Akron, Ohio, assignor to The General Tire & Rubber Company, Akron, Ohio, a corporation of Ohio Application February 16, 1939, Serial No. 256,687

6 Claims. (Cl. 192—2)

This invention relates to an air brake suitable for stopping line shafting and heavy machinery in emergency.

It is frequently necessary to stop heavy machinery and line shafting within a very short time to prevent serious injury to the operator or the product. Heretofore the line shafting for rubber mills, etc. has usually been stopped solely by the application of dynamic braking to the driving motor. In some cases an additional magnetic brake has been used, but, although this type of brake has been applied with great speed, its action is unsatisfactory for the reason there is no provision for taking up the initial shock in the mechanism, and unless a very low friction lining is used in the brake, chattering will occur, causing the brake to be less effective and frequently damaging the machinery.

It is, therefore, an object of this invention to provide a brake suitable for stopping heavy machinery and line shafting more quickly and with the absence of sudden shock.

It is another object to provide a brake wherein a substantial amount of the rotational energy of the machine is dissipated other than by heating the frictional surfaces.

It is a further object of this invention to provide a fluid operated brake for use alone or in conjunction with dynamic braking to yieldingly stop heavy line shafting.

Figure 2:
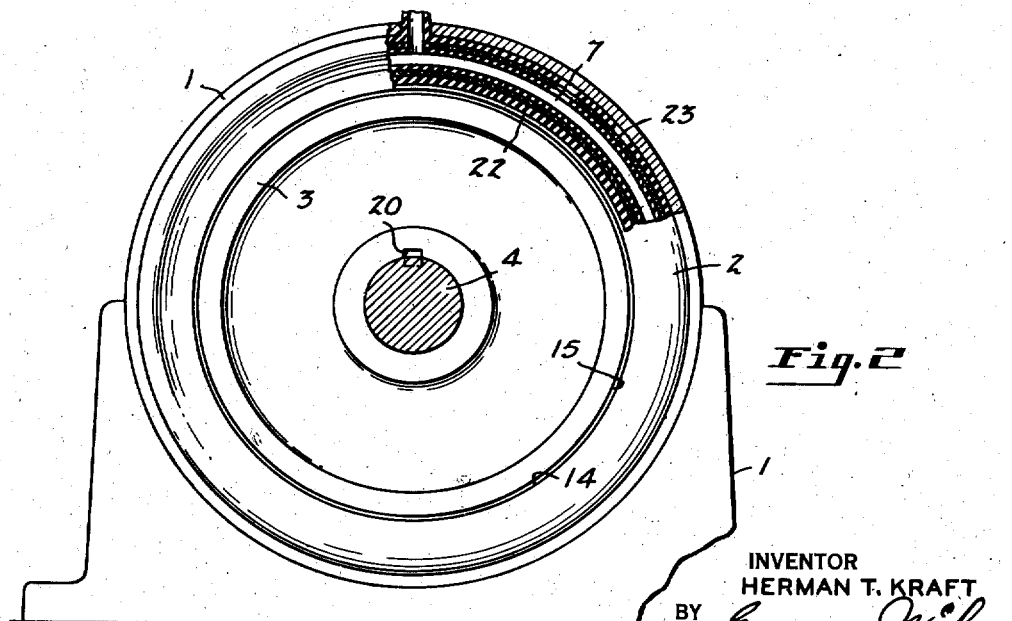

Other objects will be apparent from the following description of a suitable embodiment of my invention and from a consideration of the drawing, wherein:

Figure 1 is a longitudinal sectional view of the air brake mechanism attached to a line shafting having dynamic braking on the driving motor; and Fig. 2 is a side elevation partly in section of the brake mechanism.

Referring more particularly to the drawing, the air brake briefly comprises a rigidly mounted outer member 1 which is preferably a continuous ring with a pedestal base and which carries an inwardly inflatable brake shoe 2 which acts on the drum 3 carried by the line shaft 4 and fastened thereto by a fastening means such as the key 20. An air line 6 having a fast operating valve 5 operated by a safety trip means such as an emergency stop wire 8, extending across the front of the exposed parts of the line shafting and heavy machinery (not shown), is connected to the cavity 7 of the inwardly inflatable brake shoe 2. The valve 5 may have a toggle 25 fitted with the stop 26 to normally hold the valve in the closed position, and the wire 8 is also preferably connected to the switch 9 of the motor control. The driving motor 10 may be fitted with a suitable dynamic brake resistor 11 which is connected across the terminals 12 and 13 of the motor when the trip wire 8 is pulled.

The line 6 is connected to a relatively large source (not shown) of compressed air or other rapidly flowable fluid, and when the wire 8 is pulled by the operator the rapid acting valve 5 is opened, allowing the air or other fluid under high pressure to be admitted through the remainder of the tube 6 which is connected to the cavity 7 of the brake member 2. This expands the surface 14 of the brake member 2 against the surface 15 of the drum 3 with great force, and effectively decelerates the rotation of the drum 3 and the line shafting 4. The inwardly inflatable, resilient brake member 2 may be of rubber and should be firmly attached to the rigid member 1 by suitable means, and it is preferably vulcanized or adhesively attached thereto. The inflatable brake shoe is of axially oblong form and the cavity 7 is of slight radial depth so as to have a relatively small volumetric capacity. The fluid line 6 together with the valve 5 and inlet into the shoe 2 are of relatively large size to provide rapid inflation of the shoe 2 and prevent an appreciable lapse of time before the surfaces 14 and 15 come into contact after the valve is tripped by pulling the safety tripping means 8. The flattened cross-sectional form of shoe is preferred because the engaging surface 14 of the flexible shoe 2 is of large area and may be moved instantly against the surface 15 of the drum with the full pressure of the fluid exerted substantially throughout the contact area. Pressure may then be applied all around the periphery of the drum 3 even though the ring 1 is not exactly concentric with the shaft 4. The inwardly inflatable, resilient brake shoe 2 may contain fabric or other suitable, substantially non-extensible reinforcing layers 23. The reinforcing material may be composed of cords, and for maximum flexibility all the cords should lie in radial planes.

In order to provide fast braking action the clearance between the surfaces 14 and 15 should be just sufficient to insure free rotation of the drum 3 when the fluid in the cavity 7 is at atmospheric pressure. Contact will then be made between the frictional surfaces immediately on tripping the valve 5.

The line shafting may be brought rapidly to rest by the friction between the surfaces 14 and 15 alone, but the rapidity of stop is improved by the combination with dynamic braking in the motor. Therefore, simultaneously with the opening of the valve 5 the safety trip means, such as the wire 8, preferably trips the switch 9 so that the movable contact 16 is moved from its connection with the contact 17 over to contact 18, thus interrupting the line current flowing through the motor leads 19 and 21 and connecting the dynamic braking resistor 11 across the line.

Because of the resilience in the flexible shoe 2 the surface 14 may be made of exceptionally high friction material, and, although a tremendous deceleration may be applied to the drum 3 and the shaft 4, the shock will be taken up with the relative movement between the surface 14 and the ring 2. It is thus permissible to apply a higher maximum decelerating torque to the shaft 4 without the damaging shock or chatter found in the case of sufficiently strong magnetic brakes, and, although the initial torque applied to the shaft may be less with my improved brake, a quicker stop may be obtained.

The surface 14 of the shoe 2 may carry grooves 22, which increase the flexibility of the drum engaging wall so that the pressure is more uniformly applied throughout the area of contact with the drum. The flexibility provided by the grooves 22 enables the shoe to have effective frictional engagement with the drum even though the drum surface be uneven due to foreign matter adhering thereto, such as may accumulate when the brake is seldom used, since the flexible engaging surface will readily bend around projections on the surface of the drum.

It may be seen that the mechanism described above is exceptionally suitable for the production of brakes of large diameter for application to the relatively slow speed shafts of heavy machinery, which are yieldably stopped in an exceptionally short time. It is especially suitable for application to machinery in combination with dynamic braking as herein described. Since a considerable portion of the rotational energy in the machine may be taken up by the elasticity of the resilient brake member, a substantial reduction in the heat generated at the frictional surface may occur.

Although a single embodiment of this invention has been herein shown and described, it will be understood that numerous modifications of the construction may be resorted to without departing from the spirit of the invention as defined in the appended claims.

What I claim is:

1. In combination with apparatus adapted for dynamically braking the driving motor of machinery and line shafting, a fluid operated brake comprising a rigidly mounted outer member, an inwardly inflatable brake shoe carried by said outer member, a rotatable drum mounted substantially concentric with said brake shoe, and safety trip means for rapidly supplying compressed fluid to said inflatable shoe and breaking the motor circuit, and means for substantially simultaneously applying dynamic braking to the driving motor.

2. In combination with apparatus for dynamically braking the driving motor of machinery and line shafting, a fluid operated brake comprising a rigidly mounted outer member, an inwardly inflatable brake shoe containing substantially non-extensible reinforcing layers carried by said outer member, a rotatable drum mounted substantially concentric with said brake shoe and connected to said machinery, and rapidly acting trip means for supplying compressed air to said inflatable brake shoe and breaking the motor circuit, and means for substantially simultaneously applying dynamic braking to the driving motor.

3. In combination with apparatus for dynamically braking the driving motor of machinery and line shafting, a fluid operated brake comprising a rigidly mounted outer member, an inwardly inflatable brake shoe containing substantially non-extensible reinforcing layers and having a high frictional surface carried by said outer member, a rotatable drum mounted substantially concentric with said brake shoe and connected to said machinery, and rapidly acting trip means for supplying compressed air to said inflatable brake shoe and breaking the motor circuit, and means for substantially simultaneously applying dynamic braking to the driving motor.

4. In combination with apparatus for dynamically braking the driving motor of machinery and line shafting, a fluid operated brake comprising a rotatable drum, a rigidly mounted outer member extending substantially around the drum, an inwardly expansible inflatable brake shoe having a cavity of greater actual length than radial depth, and having an engaging surface carried and substantially entirely restrained by externally unsupported radially flexible and circumferentially yieldable side walls which extend substantially continuously around said drum and which are carried by said outer member, means for rapidly supplying fluid to said inflatable brake shoe and for breaking the motor circuit, and means for substantially simultaneously applying dynamic braking to the driving motor whereby a decelerating torque may be applied to said rotatable drum.

5. The brake of claim 4 wherein the side walls of said inflatable brake shoe are of rubber and contain reinforcing cords.

6. The brake of claim 4 wherein the side walls are adhesively attached to the rigidly mounted outer member and wherein the brake shoe has a grooved engaging surface.

HERMAN T. KRAFT.